(12) United States Patent
Sartori

(10) Patent No.: US 8,438,973 B2
(45) Date of Patent: May 14, 2013

(54) LOCKING DEVICE FOR COLUMNS OF MOULDING PRESSES

(75) Inventor: Alessandro Sartori, Mazzano (IT)

(73) Assignee: Italtech S.p.A., Mazzano (BS) (IT)

( * ) Notice: Subject to any disclaimer, the term of this patent is extended or adjusted under 35 U.S.C. 154(b) by 7 days.

(21) Appl. No.: 13/256,482

(22) PCT Filed: Mar. 17, 2010

(86) PCT No.: PCT/IB2010/051151
§ 371 (c)(1),
(2), (4) Date: Sep. 28, 2011

(87) PCT Pub. No.: WO2010/109374
PCT Pub. Date: Sep. 30, 2010

(65) Prior Publication Data
US 2012/0037014 A1    Feb. 16, 2012

(30) Foreign Application Priority Data

Mar. 23, 2009 (IT) .............................. PD2009A0056
Nov. 24, 2009 (IT) .............................. PD2009A0352

(51) Int. Cl.
*B29C 45/64* (2006.01)
(52) U.S. Cl.
USPC ............................ 100/102; 100/219; 425/595

(58) Field of Classification Search ................... 100/219; 425/595
See application file for complete search history.

(56) References Cited

U.S. PATENT DOCUMENTS

| 4,571,169 | A  | * | 2/1986  | Shima et al. ............... 425/451.9 |
| 6,261,505 | B1 | * | 7/2001  | Glaesener .................. 264/328.1 |
| 6,439,875 | B1 | * | 8/2002  | Morita et al. ................. 425/556 |
| 6,811,394 | B2 | * | 11/2004 | Yoda ............................. 425/590 |
| 2005/0281908 | A1 | * | 12/2005 | Tsuji et al. .................... 425/595 |
| 2007/0158875 | A1 | * | 7/2007  | Tokui et al. ................... 264/299 |

FOREIGN PATENT DOCUMENTS

| DE | 10104652 | | 5/2002 |
| DE | 10104652 A1 | * | 5/2008 |

* cited by examiner

*Primary Examiner* — Dana Ross
*Assistant Examiner* — Onekki Jolly
(74) *Attorney, Agent, or Firm* — Themis Law

(57) ABSTRACT

Locking device for columns (A) of presses with at least one stationary platen and at least one moveable platen (E), comprising, in a containment body (D), a wedge flange (G) firmly fastened to the back of the tightening wedges (B) and able to translate axially, and where after the tightening of said wedges (B) on said column (A), the group formed by the piston (C) acting on said wedges (B), said wedge flange (G), said wedges (B) and said column (A) translates with a maximum stroke (m) limited by a starting or resting position of the wedge flange (G) to an end stop position, determined by the pressing of said wedge flange (G) on the rear plate (D2) of said containment body (D).

7 Claims, 4 Drawing Sheets

LOCKING DEVICE FOR COLUMNS OF MOULDING PRESSES

This patent relates to locking devices for bars or columns loaded axially and in particular concerns a new active type of locking device, especially for bars or columns of moulding presses, such as for plastic injection.

The moulding presses known today include a stationary platen and a moveable platen designed to be opposed and pressed against a mould placed in between the platens themselves, where between said stationary platen and said moveable platen the injection of the plastic for the moulding occurs.

Said moveable platen can move with respect to the stationary platen approaching or moving away from it running along a sliding plane with its motion guided by one or more bars or columns rigidly constrained to the stationary platen and/or to other devices.

During the plastic injection and moulding operation, said moveable platen must be maintained pressed against the mould placed between said stationary platen and said moveable platen with enough pressure to counteract the pressure in the mould.

To this end, said moveable platen is locked and bound to the columns using locking devices fastened on each column, each one integral with said moveable platen and capable of being tightened to the column to prevent any translation of the moveable platen and exerting a compression force on the mould.

Locking devices of a passive type are known, created as safety devices, for press columns comprising a containment body which houses a locking element operating on the column, having a substantially conical or tapered external shape, featuring an axial notch such as to be substantially flexible in the radial direction, in order to be tightened on that column.

Said conical locking element is inserted into an outer annular element axially perforated, having a substantially conical or tapered inner shape, corresponding to said locking element.

Said locking element is axially loaded by a spring against a release piston which is located in said housing, from the opposite side with respect to said locking element, a chamber in which a fluid can be injected under pressure, such as compressed air or oil.

The injection/suction of the fluid under pressure into/from said chamber causes the translation in the axial direction of said piston, the stroke of which is limited on one side by said containment body and on the opposite side by a mechanical stop integral with the containment body.

This external ring-shaped element is also axially movable and can be axially loaded by a spring operating in the opposite direction with respect to the spring operating on said locking element.

Under normal conditions, when the translation of the column with respect to the locking device is necessary, said chamber receives the injected fluid, so that the piston pushes the locking element into the release position, counteracting the force of said spring of the locking element.

On the contrary, to lock the column, it is sufficient to decrease the pressure from said chamber, so that the spring pushes the locking element against the external ring-shaped element, thus counteracting the force of the spring of the ring-shaped element itself.

Said locking element tightens against the column as a result of that external ring-shaped element and also axially loads the column itself.

If the column is further loaded, said spring of the external ring-shaped element is unable to counteract the force and the locking element translates further against the piston, which moves to the end stop, while the locking element is tightened further on that column.

DE 10104652 patent refers to a locking mechanism for the moveable platen of injection moulding presses, comprising a blocking wedge connected to a column operating in combination with a piston, in which the locking action takes place by injecting fluid under pressure in a ring-shaped chamber communicating with the piston, such that by increasing the fluid pressure in the chamber, said piston acts on said wedge which tightens on the column. U.S. Pat. No. 6,261,505 relates to a locking mechanism for columns, including a locking ring-shaped wedge connected to, the column, a translation piston capable of translating the wedge from an initial position to a preload position and a locking piston capable of applying the locking force to that wedge, said fluid dynamic pistons being driven by injecting/aspirating pressurized oil with the help of cylinders.

The object of this patent is a new type of locking system especially for columns of injection moulding presses for plastic materials, for example.

The main task of the new locking device is to allow the sliding of the moveable platen during normal mould opening and closing operations, and to block the sliding movement of the moveable platen by tightening it on the column, also applying, a closing force on the moveable platen against the mould located between said moveable platen and the stationary platen.

Another purpose of this original mechanism is to accurately monitor and adjust the closing force applied to the moveable platen through fluid dynamic devices.

Another advantage of the present invention is that of being able to operate in an active rather than passive mode, that is, the locking occurs and is maintained if pressure is exercised in the locking chamber.

When there is no pressure in the locking chamber, the new device does not block the column, thus allowing the opening of the machine and the translation of the moveable platen even if there is an interruption of the electric power, without requiring additional and specific strategies or equipment.

On the contrary, a passive system, in the absence of pressure in the locking chamber, remains blocked on the column as a result of the mechanical force applied by elastic devices.

Another advantage of the present invention is that the new device, according to a preferred embodiment of the invention, is entirely fluid dynamic based with no elastic mechanical devices, which are notoriously more subject to wear.

Another advantage of the present invention is that it is safer than passive mechanisms, especially in the event of a sudden power failure when the press is in motion which may result, in the absence of additional safety devices, in an instant blocking of the machine. This is very dangerous for the mechanics of the entire machine, given the high inertial forces involved. Another advantage of the present invention is that it is simpler from the construction point of view than existing systems because it has fewer parts and requires only a fluid dynamic supply for the locking and unlocking chamber. For these reasons, it is also considerably cheaper than existing systems.

These and other direct and complementary purposes are achieved by the new active locking device for columns of moulding presses, said device being suitable to be connected to a column of a press and bound to the moveable platen.

The new device is particularly suitable for use with presses such as those for plastic injection units equipped with horizontal columns.

Said locking device includes, with reference to its main parts, a containment body, preferably substantially cylindrical, connected to the column and equipped on both ends with a front plate, suited to be integrally constrained to the said moveable platen and a rear plate integral with the containment body itself.

Inside the containment body there is one or more locking elements or wedges with a substantially conical or tapered external shape, intended to tighten on that column.

Said wedges are tightened against that column thanks to a piston connected to the column and having an axial hole with a conical or tapered shape corresponding to that of said external surface of the wedges and suitable to couple precisely with said wedges themselves.

It is foreseen that the surface of the wedges that must come into contact with the surface of said column is coated with special materials or treated to increase its grip, while the conical or tapered surface of the piston and/or the wedge is coated with an anti-friction finishing, so as to minimize the dissipative forces due to friction, facilitating the relative sliding and therefore the tightening of the wedges on the column.

Between said front plate and said piston there is a locking chamber, in which, through a junction, a fluid such as oil or compressed air is injected to drive said piston in an axial direction and away from said moveable platen. Between said rear plate and said piston there is an unlocking chamber, in which, through a junction, a fluid such as oil or compressed air is injected to drive said piston in an axial direction and toward said moveable platen.

In the preferred embodiment, said device includes at least one wedge flange, integral with the back side of said wedges. Said flange includes at least one stop surface area where the pressure for the unlocking chamber is applied which faces the inside of said unlocking chamber.

When positive pressure is applied in said locking chamber, maintaining zero or controlled pressure in said unlocking chamber, said piston is driven to compress said wedges which tighten on the column.

In this way the unit consisting of the piston, the wedge flange, the wedges and the column is essentially a rigid body.

After said wedges tighten on the column, as a result of the positive pressure in said locking chamber, said piston exercises an outward axial tensile stress moving away from said moveable platen on said column. This tensile stress on said column, due to the principle of action and reaction, produces a compressive stress from the moveable platen to the mould.

The unit consisting of the piston, the wedge flange, the wedges and the column can perform a translation movement with a stretching stroke limited by a start stroke position or flange resting position, that is, from the position assumed by said flange while maintaining zero pressure in the locking chamber and with a determined pressure value in said unlocking chamber, to the end stop position as determined by the rear plate.

In contrast, when the pressure in said locking chamber is zero and said unlocking chamber is subjected to a determined positive pressure, said piston is driven in the axial direction but in the opposite direction, that is, toward the moveable platen, allowing the wedges to radially flex outward, returning to resting position and releasing the column.

As a result of the pressure applied in the unlocking chamber and acting on said stop surface area of the flange, said wedge flange returns to said resting position.

After unlocking, said column is no longer bound to the locking device which can translate firmly fixed to said moveable platen, with respect to said column.

Thus the new device basically works in three phases:

An unlocking phase: by applying pressure in the unlocking chamber with zero pressure in the locking chamber, the piston moves towards the moveable platen, freeing the wedges from the column and returning the wedge flange to the resting position;

An opening/closing phase: when unlocked the device is released from the column and the press can freely open/close; a minimum value of pressure can be maintained in said unlocking chamber so as to prevent said wedges, which have released from the column, from moving axially;

A locking phase: by applying pressure in the locking chamber; when the wedges are locked on the column, it is possible to release said minimum pressure in the unlocking chamber so as to impart the maximum locking force. Indeed, positive pressure in the unlocking chamber when the wedges have tightened on the column counteracts the locking force.

In the preferred embodiment, it is foreseen that said locking chamber and said unlocking chamber do not communicate with the column, in such a way that the column never comes into contact with the operating fluid in order to ensure the seal of the gaskets even in case of accidental damage to the column.

The characteristics of the new mechanism will be better clarified by the following description with reference to the drawings, attached by way of a non-limiting example.

FIG. 3 shows a schematic cross section of the new device according to a further possible embodiment, while

Figure 1:
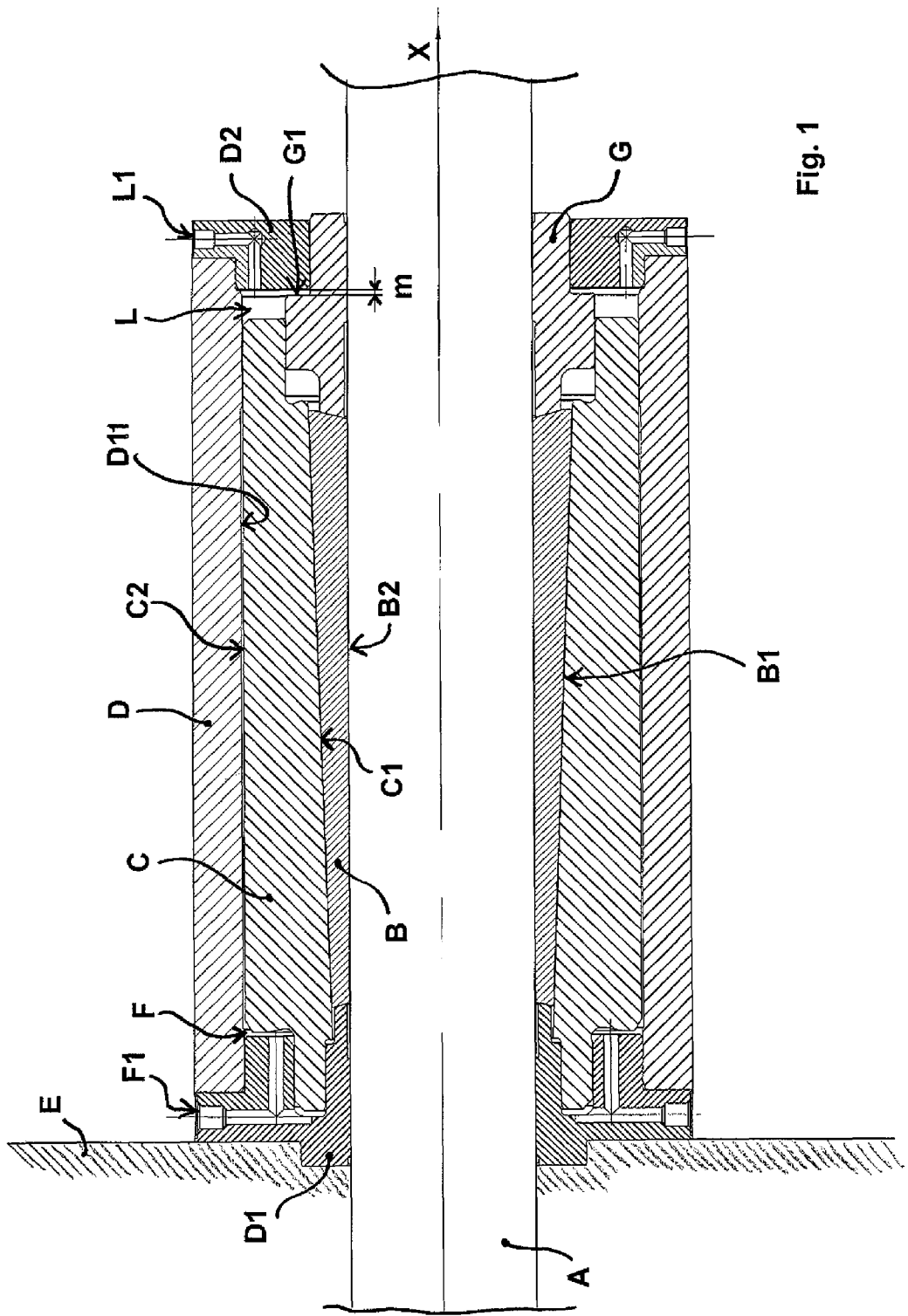
FIG. 1 shows a schematic cross section of the new device according to the preferred embodiment.

With reference to FIG. 1, the new locking device is mounted on each of the columns (A) of presses equipped with at least one stationary platen and at least one moveable platen (E), translating with respect to said stationary platen and said columns (A).

The new device is particularly suitable for application on presses with horizontal columns.

The new locking device includes a containment body (D) connected to said column (A), and equipped on both ends with a rear plate, a front plate (D1), suitable to be firmly fastened to said moveable platen (E), and a rear plate (D2).

Within the containment body (D) one or more locking elements or wedges (B) are housed acting on the surface of said column (A), said wedges (B) having a substantially conical or tapered outer surface (B1) and suitable of being locked onto the column (A) as the result of the action of at least one piston (C) having a substantially conical or tapered inner surface (C1) corresponding to said outer surface (B1) of the wedges (B), to couple exactly with said wedges (B) themselves.

Within the containment body (D), between said front plate (D1) and said piston (C), there is at least one locking chamber (F), in which, through a junction (F1) operating fluid is injected to drive said piston (C) in the axial direction (X) and moving away from said moveable platen (E).

Within the containment body (D), between said rear plate (D2) and said piston (C) there is at least one unlocking chamber (L), in which, through a junction (L1), operating fluid is injected to drive said piston (C) in the axial direction (X) but in the opposite direction toward said moveable platen (E). When positive pressure is applied in said locking chamber (F), maintaining zero or controlled pressure in said unlocking chamber (L), said piston (C) is driven to compress said wedges (B) which tighten on the column (A).

After the tightening of said wedges (B) on said column (A), while maintaining zero or controlled pressure in said unlocking chamber (L) and positive pressure in said locking chamber (F), said piston (C) imparts on said column (A), via said wedges (B) themselves, a tensile stress in the axial direction (X), in the direction moving away from said moveable platen (E). This tensile stress on said column (A), due to the principle of action and reaction, produces a compressive stress from the moveable platen (E) to the mould.

Conversely, when positive pressure is applied in said unlocking chamber (L), maintaining zero pressure in said locking chamber (F), said piston (C) is driven in the axial direction (X) but in the opposite direction, that is, in the direction toward said moveable platen (E), enabling said wedges (B) to flex radially outward, releasing the column (A).

Within the containment body (D) there is also at least one wedge flange (G), firmly fastened at the back of said wedges (B) and including at least one stop surface (G1) facing the interior of said unlocking chamber (L), upon which the pressure applied in said unlocking chamber (L) itself operates.

Figure 2:
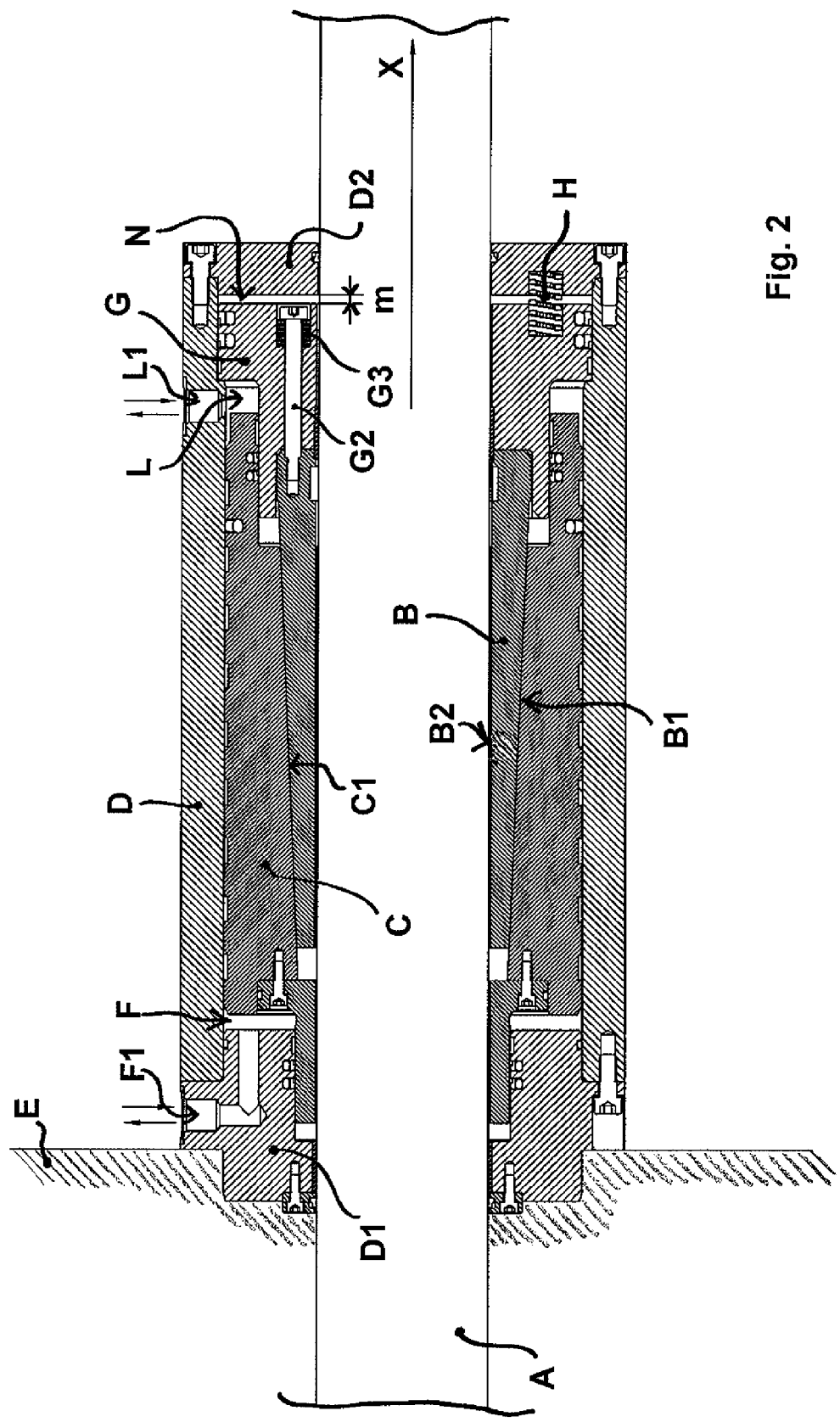
FIG. 2 shows a schematic cross section of the new device according to a further possible embodiment.
Figure 3:
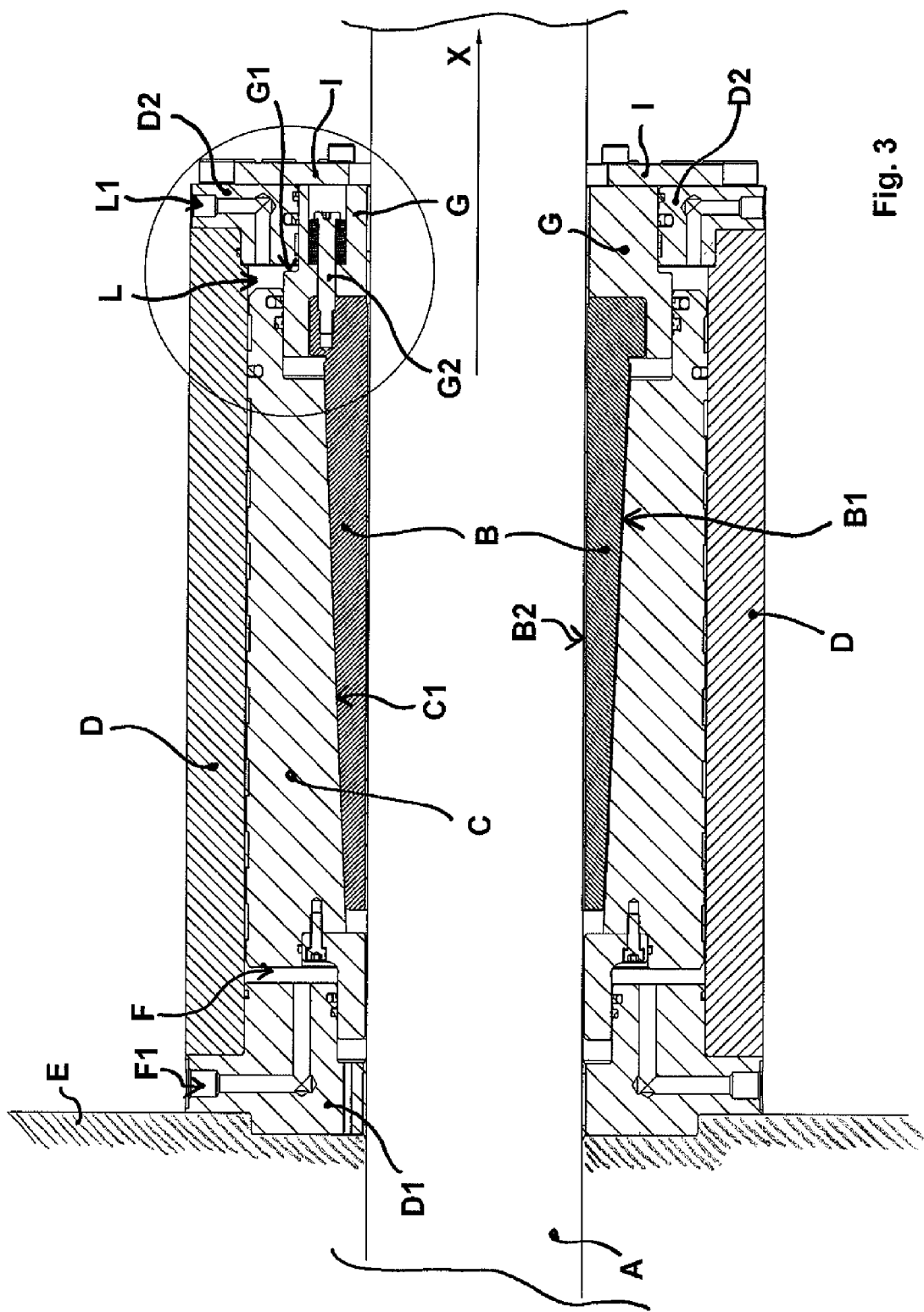

It can be foreseen that this wedge flange (G) is fastened to said wedges (B), for example by screws (G2), as in FIGS. 2 and 3, where on the shank of the screw there is a prestressed compression spring inserted (G3), the function of which is to guide the expansion of the wedges (B) with respect to the column (A) when unlocking.

Alternatively, it is possible to foresee the use of a single wedge (B) having grooves and suitable to deform and tighten on the column.

In the locking phase of the column (A), by increasing the pressure in said locking chamber (F) and maintaining a specified pressure value in said unlocking chamber (L), said wedge flange (G) is held in the starting or resting position, while said piston (C) acts on said wedges (B) which lock on said column (A).

Said starting or resting position is determined by the pressing of the wedges (B) on the front plate (D1) and is achieved thanks to the pressure produced on the wedge flange (G) by the pressure acting on the stop surface (G1) when zero pressure is maintained in the locking chamber (F).

During the stretching phase of the column (A), when said wedges (B) are locked on said column (A), the group formed by said piston (C), said wedges (B), said wedge flange (G) and said column (A), translates by one maximum stroke (m) limited between said starting or resting position and an end position, which is delimited by the stroke of said stop surface (G1) on said rear plate (D2).

During the unlocking phase of the column (A), when positive pressure is applied in said unlocking chamber (L), maintaining zero pressure in said locking chamber (F), the piston (C) translates and strikes the front plate (D1) and said wedge flange (0) returns to said resting position due to the pressure applied in said unlocking chamber (L) on said stop surface (G1) of said wedge flange (G).

According to this solution, the operation of the new device is extremely simple and is entirely based on fluid dynamics, that is, it does not makes use of elastic means in any way. The movement of the wedge flange (G), together with the wedges (B), and the piston (C) is in fact completely controlled by adjusting the pressure in said unlocking (L) and locking (F) chambers.

Furthermore, the number of components of the new device is overall lower with respect to those of known locking devices, thereby resulting in lower construction and assembly costs.

In addition, it is foreseen that between said piston (C) and said containment body (D), along the outer surface (C2) of the piston (C) and the opposing inner surface (D11) of the containment body (D), the pressure of the operating fluid acts in order to reduce the stresses and deformation of the piston (C) itself. In fact, when said piston (C) is driven to tighten said wedges (B), it tends to open radially outward and the action of the pressure on its outer surface (C2) in part contrasts the stress and radial deformation of the piston (C) itself.

According to an alternative solution, with reference to FIG. 2, it is foreseen that said wedge flange (G) inside said containment body (D) is placed in front of said rear plate (D2), said unlocking chamber (L) being located between this wedge flange (G) and said piston (C).

The translation of said wedge flange (G) towards said rear plate (D2) is countered by an elastic means (H) interposed between said rear plate (D2) and said flange (G) itself, capable of returning said wedge flange (G) to the resting position, pushing said wedges (B) towards said front plate (D1) and allowing the wedges (B) themselves to flex radially outward, releasing the column (A), when a positive pressure is applied to said unlocking chamber (L), maintaining a zero pressure in said locking chamber (F).

Between said wedge flange (G) and said rear plate (D2) there is a stretching chamber (N) able to allow the stretching movement (in) of said group formed by said piston (C), said wedge flange (G), said wedges (B) and said column (A).

Said group can then translate with a stretching movement (m), limited by an starting stroke position or flange resting position (G), that is, from the position assumed by said flange (G) while there is zero pressure in the locking chamber (F) when the piston (C) is pressing on the front plate (D1), at the end stop position, determined by the rear plate (D2).

In contrast, when the pressure in said locking chamber (F) is zero and said unlocking chamber (L) is subjected to a determined positive pressure said piston (C) is driven in the axial direction (X) but in the opposite direction, that is, toward the moveable platen (E), allowing the wedges (B) to radially flex outward, returning to resting position and releasing the column (A).

Said wedge flange (B), as a result of said elastic means (H), returns to said resting position.

After unlocking, said column (A) is no longer bound to said locking device which can translate firmly fixed to said moveable platen (E), with respect to said column (A).

Figure 3A:
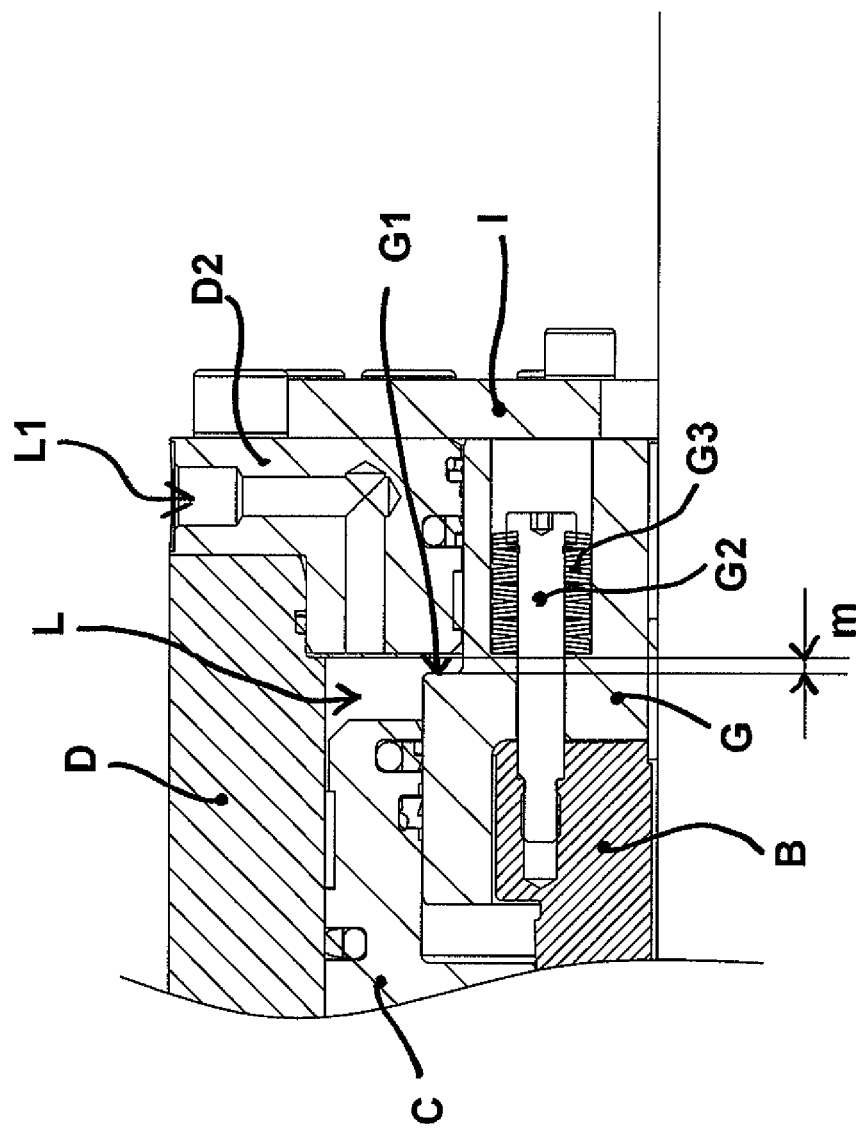
FIG. 3a illustrates a detail.

According to another possible alternative solution, with reference to FIGS. 3 and 3*a*, in the interior of the containment body (D) there is at least one wedge flange (G), firmly fastened at the back of said wedges (B) and comprising at least one stop surface (G1), upon which the pressure applied in said unlocking chamber (L) operates, and at least one additional rear flange (I), bound to said wedge flange (G), and where said rear plate (D2) is substantially interposed with a clearance (m) between said flange (G) and said rear flange (I).

The translation of the wedge flange (G), firmly fastened to the wedges (B), is thus limited between a resting position where said rear flange (I) is pressing on said rear plate (D2), and an end stop position where said stop surface (G1) of the wedge flange (G) is pressing on said rear plate (D2). In contrast, when the pressure in said locking chamber (F) is zero and said unlocking chamber (L) is subjected to a determined positive pressure, said piston (C) translates and presses on said front plate (D1) and said wedge flange (G) returns to said resting position as a result of said pressure applied in said unlocking chamber (L) on said stop surface (G1) of said wedge flange (G) itself, pushing said wedges (B) towards said front plate (D1) and allowing the wedges (B) themselves to flex radially outward, releasing the column (A).

In all the solutions above, it is additionally foreseen that the surface (B2) of said wedges (B) in contact with the surface of said column (A) is coated with special materials or treated to increase its grip, while the conical or tapered surface (C1, B1) of said piston (C) and/or said wedges (B) is/are coated with an anti-friction finishing, so as to minimize the dissipative forces due to friction, facilitating the relative sliding and therefore the tightening of the wedges (B) on the column (A).

It is also foreseen that said locking chamber (F) and said unlocking chamber (L) do not communicate with said column (A) such that column (A) never comes into contact with the operating fluid.

Therefore, with reference to the description above and the attached drawings the following claims are made.

The invention claimed is:

1. A locking device for columns (A) of presses with at least one stationary platen and at least one movable platen (E), comprising:
   a containment body (D) connected to a column (A), and equipped on both ends with a bottom plate, an front plate (D1), suitable to be firmly fastened to said moveable platen (E), and a rear plate (D2);
   one or more locking elements or wedges (B) housed in an interior of said containment body (D) and acting on a surface of said column (A), said wedges (B) having a substantially conical or tapered outer surface (B1);
   at least one piston (C) suitable to tighten said wedges (B) on said column (A), said piston (C) having a substantially conical or tapered inner surface (C1) corresponding to said outer surface (B1) of the wedges (B), to couple exactly with said wedges (B) themselves;
   a locking chamber (F) located between said front plate (D1) and said piston (C), in which, through a junction (F1), an operating fluid is injected in order to drive said piston (C) in an axial direction (X) and moving away from said moveable platen (E); and
   an unlocking chamber (L) located between said rear plate (D2) and said piston (C), in which, through a junction (L1), the operating fluid is injected in order to drive said piston (C) in an axial direction (X) and toward said moveable platen (E); wherein applying a positive pressure in said locking chamber (F) and maintaining controlled value of pressure in said unlocking chamber (L), said piston (C) is pushed to compress said wedges (B) that tighten on the column (A), while applying positive pressure in said unlocking chamber (L), maintaining zero pressure in said locking chamber (F), said piston (C) is pushed in the axial direction (X) but in the opposite direction, that is, toward said moveable platen (E), allowing the wedges (B) to flex radially outward, releasing the column (A),
   further comprising, in said containment body (D) at least one wedge flange (G) firmly fastened to a back of said wedges (B) and able to translate axially,
   wherein after the tightening of said wedges (B) on said column (A) by applying positive pressure in said locking chamber (F) and maintaining zero or controlled pressure in said unlocking chamber (L), a group formed by said piston (C), said wedge flange (G), said wedges (B) and said column (A) translates with a maximum stroke (m) limited by a starting or resting position of the wedge flange (G) to an end stop position, identified by the pressing of said wedge flange (G) on said rear plate (D2), and
   wherein the wedge flange (G) includes at least one stop surface (G1) on which the pressure applied in said unlocking chamber (L) operates,
   further comprising at least one additional rear flange (I) firmly fastened to said wedge flange (G), said rear plate (D2) being at least partially substantially interposed with a clearance between said wedge flange (G) and said rear flange (I),
   wherein, applying positive pressure in said locking chamber (F) and maintaining a specified value of pressure in said unlocking chamber (L), said wedge flange (G) is held in the starting or resting position, where said rear flange (I) is pressing on said rear plate (D2), and said wedges (W) tighten on said column (A); and
   wherein, after the tightening of said wedges (B) on said column (A), maintaining positive pressure in said locking chamber (F), the group formed by said piston (C), said wedges (B), said wedge flange (G) and said column (A) translates with said maximum stroke (m) from said starting or resting position to an end stop position, where said stop surface (G1) is pressing on said rear plate (D2).

2. A locking device for columns (A) of presses with at least one stationary platen and at least one movable platen (E), comprising:
   a containment body (D) connected to a column (A), and equipped on both ends with a bottom plate, an front plate (D1), suitable to be firmly fastened to said moveable platen (E), and a rear plate (D2);
   one or more locking elements or wedges (B) housed in an interior of said containment body (D) and acting on a surface of said column (A), said wedges (B) having a substantially conical or tapered outer surface (B1);
   at least one piston (C) suitable to tighten said wedges (B) on said column (A), said piston (C) having a substantially conical or tapered inner surface (C1) corresponding to said outer surface (B1) of the wedges (B), to couple exactly with said wedges (B) themselves;
   a locking chamber (F) located between said front plate (D1) and said piston (C), in which, through a junction (F1), an operating fluid is injected in order to drive said piston (C) in an axial direction (X) and moving away from said moveable platen (E); and
   an unlocking chamber (L) located between said rear plate (D2) and said piston (C), in which, through a junction (L1), the operating fluid is injected in order to drive said piston (C) in an axial direction (X) and toward said moveable platen (E); wherein applying a positive pressure in said locking chamber (F) and maintaining controlled value of pressure in said unlocking chamber (L), said piston (C) is pushed to compress said wedges (B) that tighten on the column (A), while applying positive pressure in said unlocking chamber (L), maintaining zero pressure in said locking chamber (F), said piston (C) is pushed in the axial direction (X) but in the opposite direction, that is, toward said moveable platen (E), allowing the wedges (B) to flex radially outward, releasing the column (A),
   further comprising, in said containment body (D) at least one wedge flange (G) firmly fastened to a back of said wedges (B) and able to translate axially,
   wherein after the tightening of said wedges (B) on said column (A) by applying positive pressure in said locking chamber (F) and maintaining zero or controlled pressure in said unlocking chamber (L), a group formed by said piston (C), said wedge flange (G), said wedges (B) and said column (A) translates with a maximum stroke (m) limited by a starting or resting position of the wedge flange (G) to an end stop position, identified by the pressing of said wedge flange (G) on said rear plate (D2), wherein said wedge flange (G) inside said containment body (D) is located in front of said rear plate (D2), said unlocking chamber (L) being located between said wedge flange (G) and said piston (C), and wherein the translation of said wedge flange (G) itself toward said rear plate (D2) is counteracted by at least one elastic means (H) able to return said wedge flange (G) in said resting position, pushing said wedges (B) towards said front plate (D1) and allowing the wedges (B) themselves to flex radially outward, releasing the column (A), when positive pressure is applied in said unlocking chamber (L), maintaining zero pressure in said locking chamber (F).

3. The locking device according to claim 2, wherein between said wedge flange (G) and said rear plate (D2) there is a stretching chamber (N) able to allow stretching movement (m) of said group formed by said piston (C), said wedge flange (G), said wedges (B) and said column (A).

4. The locking device according to claim 1, wherein the surface (B2) of said wedges (B) in contact with the surface of said column (A) is coated with material treated to increase its grip.

5. The locking device according to claim 1, wherein the conical or tapered (C1, B1) surface of one or more of said piston (C) or said wedges (B) is coated with an anti-friction finishing, so as to minimize dissipative forces due to friction, facilitating relative sliding.

6. The locking device according to claim 1, wherein said locking chamber (F) and said unlocking chamber (L) do not communicate with said column (A) such that column (A) never comes into contact with the operating fluid.

7. The locking device according to claim 1, wherein between said piston (C) and said containment body (D), along the outer surface (C2) of the piston (C) and the opposing inner surface (D11) of the containment body (D), the pressure of the operating fluid operates in order to counteract, at least partly, stresses and deformation in radial direction toward the outside of said piston (C) when pushed to tighten on said wedges (B).

* * * * *